Patented Nov. 27, 1951

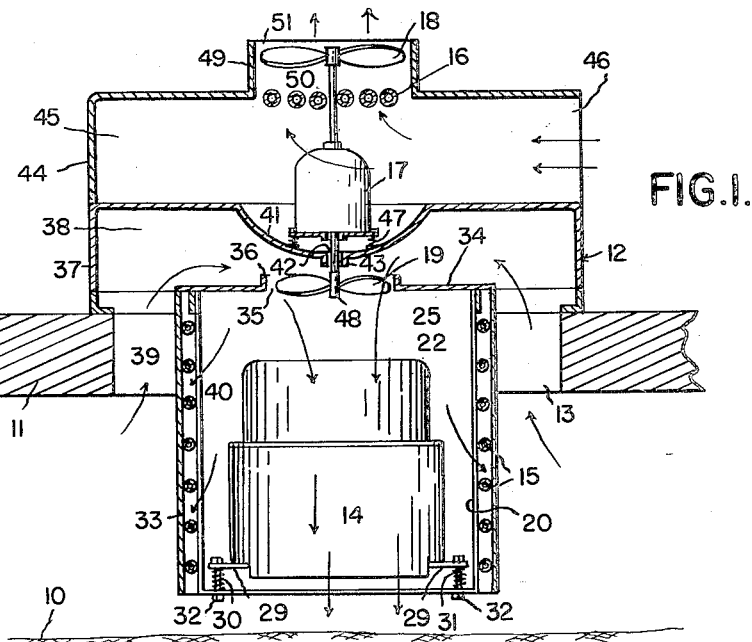
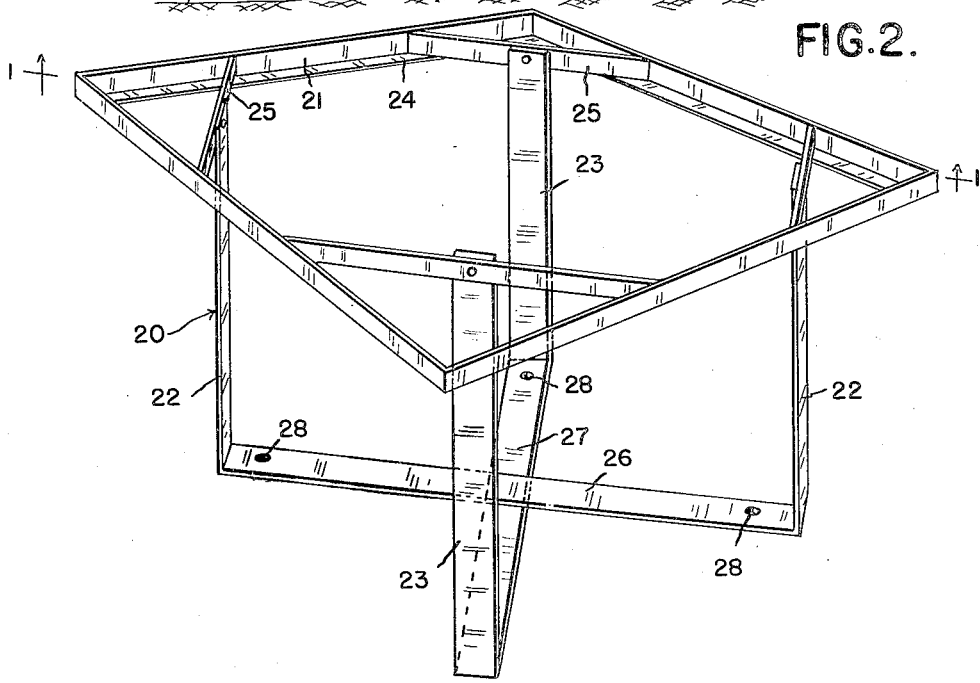

2,576,549

UNITED STATES PATENT OFFICE 2,576,549

AIR-CONDITIONING UNIT

Carl J. Wagner and Grant V. Mack, Sturgis, Mich., assignors to Marvel Industries, Inc., Sturgis, Mich., a corporation of Michigan Application December 19, 1949, Serial No. 133,918

6 Claims. (Cl. 62—117.45)

1

The invention relates to air conditioning apparatus and more particularly to an air conditioning unit particularly adapted for use in house trailers or small homes.

It is an object of the invention to provide an air conditioning unit of a compact construction that requires a relatively small space within a trailer or room, and which may be conveniently installed in some out of the way location such as within a clothes closet.

It is a further object to provide a construction adapted to be firmly supported on the floor of a trailer in such a manner that portions of the unit extend through the floor and beneath the trailer.

It is a still further object to obtain a construction which utilizes the cool air underneath the trailer to cool the compressor-condenser unit, and which also utilizes the condensed moisture from the warm air within the trailer as an additional means for cooling said unit.

Other objects and features of the invention will become apparent as the description proceeds, especially when taken in conjunction with the accompanying drawing wherein:

Fig. 1 is a semi-diagrammatic vertical section of an air conditioning apparatus embodying the features of this invention taken along line 1—1 of Fig. 2; and Fig. 2 is a perspective view of the supporting cradle for the compressor unit.

Referring now to the drawings, the numeral 10 designates the ground above which is located the floor 11 of a conventional house trailer. An air conditioning unit 12 is suitably supported on the floor within the trailer body in such a manner that the lower portions thereof extend beneath the trailer through an opening 13 provided in the floor 11.

The air conditioning unit comprises an electrically driven refrigerant compressor unit 14, refrigerant condenser coils 15, refrigerant evaporator coils 16, and an electric motor 17 for driving a pair of fans 18 and 19 for forcing circulation of air over the evaporator and condenser coils.

A supporting cradle 20 is provided for mounting the compressor unit and the associated condenser coils beneath the floor 11. As best illustrated in Fig. 2, the cradle 20 consists of an upper supporting frame 21 and a pair of substantially U-shaped straps 22 and 23 depending therefrom. As illustrated, the supporting frame is rectangular in shape so as to correspond generally to the shape of the floor opening 13,

2 and is of angle cross section thereby providing a bottom flange 24 which may be secured to the floor adjacent the opening by any suitable means. Extending angularly across the inner corners of the frame 21 are supporting bars 25 to which are secured the U-shaped straps 22 and 23. These straps are conveniently formed of flat bar stock, and have their respective bottom portions 26 and 27 arranged in overlapping crossed relation as shown. Suitable apertures 28 are provided for receiving the mounting bolts for the compressor unit.

The compressor unit itself is not the subject of the present invention, and may be of any approved construction capable of efficiently compressing a fluid refrigerant. The unit is enclosed in an outer casing provided with apertured mounting lugs 29, and is resiliently mounted on coil springs 30 within the cradle and secured by means of bolts 31 and nuts 32.

Surrounding the U-straps of the supporting cradle are the condenser coils 15 which are connected to the compressor unit and function in the usual manner. An open bottom cylindrical casing 33 surrounds the condenser coils and is suitably secured at its upper end to the supporting frame 21. An annular plate 34 forms a cover for the upper end of the casing 33 and is provided with a central opening 35 surrounded by an upwardly projecting annular flange 36. The cover plate 34 rests on the upper edge of the cylindrical casing 33 and is removably secured thereto by any suitable means.

A second casing 37 surrounds the floor opening 13 and is mounted above the supporting frame 21 thereby forming a compartment or chamber 38. The chamber 38 communicates with the space beneath the floor by means of air passages 39 and 40 on opposite sides of the cylindrical casing 33. The arrangement is such that the cylindrical casing 33, together with its associated cover 34, acts as an air baffle for directing the flow of air in a particular manner to be hereinafter described. The top wall of the casing 37 is centrally dished to form an upwardly opening cup 41 provided with a central aperture 42 surrounded by a depending flange 43.

Resting on the casing 37 is a third casing 44 forming a compartment 45 having an air entrant opening 46 through one wall thereof. Within the compartment 45 is an electric motor 17 suitably mounted on coil springs 47 in the cup-shaped portion 41 of the casing 37, and having the lower end 48 of the motor shaft extending downwardly through aperture 42 in the cup and into lower compartment 38. A fan 19 is mounted on the shaft 48, and is encircled by the annular flange 36 adjacent the central opening 35 in the cover plate 34.

The upper casing 44 is provided with a cylindrical upper portion 49, at the base of which are mounted the refrigerant evaporator coils 16. The upper portion 49 forms a housing surrounding the upper fan 18 which is mounted on the upper end 50 of the motor shaft above the evaporator coils. The cylinder portion 49 is open at the top to provide an air outlet 51 communicating with the interior of the room.

With the construction as above described, the operation of the device is as follows. The compressor unit, condenser coils and evaporator coils perform their normal functions as in any conventional type of mechanical refrigerating apparatus. The lower fan 19 forces the air from within the lower compartment 38 down over the compressor unit and condenser coils and out through air passage 40, thereby cooling the compressor unit and the compressed refrigerant within the condenser coils. At the same time, cool air from the shaded area beneath the floor is drawn up through the air passage 39 between the cylindrical casing or air baffle 33 and the surrounding portion of the floor 11, and is circulated over the top plate 34 and down over the compressor unit and condenser coils. This flow of air is indicated by the arrows in Fig. 1 of the drawings.

Simultaneously, the upper fan 18 draws the warm air from within the trailer through the entrant opening 46 and into the upper compartment 45, where it is drawn upwardly over the evaporator coils and subsequently circulated throughout the trailer either directly or by means of suitable air ducts (not shown). It will be understood, of course, that the evaporator coils 16 could be located in the upper cylindrical portion above the fan 18, in which case the fan would push the air to be cooled over the evaporator coils.

It will be appreciated that the warm air within the trailer will normally have a relatively high moisture content which will tend to be condensed out on the cold evaporator coils. Such condensation is detrimental in that heat is evolved during condensation which must be absorbed by the refrigerant in addition to the heat which must be absorbed to lower the temperature of the surrounding air a given number of degrees. In other words, a certain amount of the cooling effect of the refrigerant is wasted in condensing the moisture from the air, and therefore cannot be utilized to cool the air itself. It is one of the features of this invention that the condensate formed on the evaporator coils is collected and utilized to aid in cooling the condenser coils, thereby regaining the loss in cooling action that occurs during the condensation process.

Referring again to Fig. 1, it will be apparent that as water collects on the surface of the evaporator coils 16 it will drip down and be collected in cup 41, from which it escapes through aperture 42 and falls onto the hub of lower fan 19. The water is thrown radially outwardly from the rapidly rotating hub by centrifugal force and onto the condenser coils 15 and compressor unit 14. Here the water is rapidly evaporated due to the circulation of air by fan 19, and during the evaporation process the heat of evaporation is absorbed from the refrigerant in the condenser coils thereby aiding in cooling the same. In this way the cooling effect that was formerly lost by condensation upon the evaporator coils is regained by evaporation on the condenser coils and compressor unit.

From the foregoing it will be apparent that we have provided an air conditioning unit that is especially well adapted for installation in house trailers. In this connection it should be noted that the unit is designed to be mounted in the floor to assure maximum structural support and minimize stresses likely to be encountered when the trailer is traveling over rough roads. In addition, by allowing the lower part of the compressor unit to extend beneath the trailer, the space required inside of the trailer is reduced to a minimum. It should further be appreciated that the present design places the compressor unit and the condenser coils in the coolest possible location, which is in the shaded area beneath the trailer. Thus the air which is used to cool the condenser coils is also the coolest air available for this purpose.

As was previously mentioned, the air conditioning unit of this invention may be satisfactorily installed in homes as well as in house trailers. It is particularly suited for use in small homes having no basement but only an air space under the floor. The unit may be mounted through the floor of such a home in the above described manner, where advantage is taken of the cool air in the shaded area beneath the floor to cool the compressor and the condenser coils.

What we claim as our invention is:

1. In a room to be air conditioned, air conditioning apparatus mounted on the floor of said room comprising upper and lower chambers, a wall separating said chambers, a refrigerant evaporator coil in the upper chamber, a motor driven fluid refrigerant compressor in the lower chamber, a condenser coil for compressed refrigerant also in said lower chamber, said upper chamber communicating with the atmosphere within the room and said lower chamber communicating with the atmosphere beneath the floor through an aperture therein, an air circulating fan within said upper chamber, an air flow controlling baffle within said lower chamber surrounding said compressor and said condenser coil, and an air circulating fan within said lower chamber for drawing air from beneath said floor to be directed by said baffle over said compressor and condenser coil and back underneath said floor.

2. In a room to be air conditioned, air conditioning apparatus comprising a casing mounted on the floor within the room forming a compartment, an aperture in the floor beneath said casing providing air communication between said compartment and the atmosphere beneath the floor, a motor driven fluid refrigerant compressor within said compartment and extending through said aperture, refrigerant condenser coils connected to said compressor and surrounding the same, a second casing above the first mentioned casing and provided with air entrant and discharge openings communicating with the interior of the room, evaporator coils within said second casing adjacent said discharge opening, an electric motor within said second casing, a fan driven by said motor for drawing air in through said entrant opening and passing it over said evaporator coils and out through said discharge opening, a second fan located within said compartment and driven by said electric motor to circulate air from beneath the room within said compartment, and an air flow controlling baffle surrounding said compressor and condenser coils to direct the flow of air within said compartment over said compressor and condenser coils to cool the same.

3. Air conditioning apparatus for use on road vehicles comprising a frame mounted on the floor surrounding an aperture therein and extending downward through said aperture but limited in depth for road clearance, a casing extending upward from said frame forming a chamber in open communication through said aperture with a space below said floor, a compressor unit mounted on said frame and extending upward into said chamber, evaporating coils above said casing, condenser coils mounted on said frame to surround said compressor unit, and air circulating means for drawing air from below said floor outside of said frame into said chamber and forcing it downward over said compressor unit and outward through said condenser coils.

4. The construction as in claim 3 in which the air circulating means is formed by a fan located in said chamber centrally over said compressor unit, and a motor above said casing having a shaft extending downward to said fan.

5. The construction as in claim 4 in which the evaporator coils are centrally above said motor, and a fan on an upwardly extending portion of the motor shaft for circulating air through said evaporator coils.

6. The construction as in claim 5 in which said casing has a cup-shaped depression centrally thereof for collecting water condensed on said evaporator coil and dropping downward therefrom, said cup-shaped depression having an aperture surrounding the downwardly extending shaft permitting flow of the condensate onto the lower fan which centrifugally throws it outward over said compressor unit and condenser coils.

CARL J. WAGNER.
GRANT V. MACK.

REFERENCES CITED

The following references are of record in the file of this patent:

UNITED STATES PATENTS

| Number | Name | Date |
|---|---|---|
| 1,825,808 | Melcher | Oct. 6, 1931 |
| 1,921,257 | Melcher | Aug. 8, 1933 |
| 2,106,515 | Wanamaker | Jan. 25, 1938 |
| 2,115,294 | Woodruff | Apr. 26, 1938 |
| 2,115,472 | Sargent | Apr. 28, 1938 |
| 2,475,841 | Jones | July 12, 1949 |